United States Patent
Sawata et al.

(10) Patent No.: US 10,884,687 B2
(45) Date of Patent: Jan. 5, 2021

(54) PRINT MANAGEMENT SYSTEM AND COMPUTER READABLE MEDIUM

(71) Applicant: FUJI XEROX CO., LTD., Tokyo (JP)

(72) Inventors: Naohiro Sawata, Yokohama (JP); Masanori Wada, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 16/559,753

(22) Filed: Sep. 4, 2019

(65) Prior Publication Data

US 2020/0241818 A1 Jul. 30, 2020

(30) Foreign Application Priority Data

Jan. 30, 2019 (JP) ................................ 2019-014685

(51) Int. Cl.
*G06F 3/12* (2006.01)

(52) U.S. Cl.
CPC .......... *G06F 3/1263* (2013.01); *G06F 3/1205* (2013.01); *G06F 3/1296* (2013.01)

(58) Field of Classification Search
None
See application file for complete search history.

(56) References Cited

U.S. PATENT DOCUMENTS

| 2007/0165248 A1* | 7/2007 | Utsunomiya | G06F 3/1208 358/1.1 |
| 2012/0069399 A1* | 3/2012 | Shibasaki | G06F 3/1204 358/1.15 |
| 2014/0356103 A1* | 12/2014 | Oki | G06F 3/1217 412/1 |

FOREIGN PATENT DOCUMENTS

JP 2014-232440 12/2014

* cited by examiner

*Primary Examiner* — Frantz Bataille
(74) *Attorney, Agent, or Firm* — Fildes & Outland, P.C.

(57) ABSTRACT

A print management system includes: a receiving unit that receives plural pieces of input data each of which includes component data and due date information; and a generating unit that, in a case where at least one piece of input data indicates that an extra part would be delivered independently from the plural input data, generates a grouped print job so that the grouped print job does not include extra data corresponding to an extra part whose delivery due date is later than shortest due date information among the due date information included in the plural pieces of input data that are received.

9 Claims, 15 Drawing Sheets

FIG. 3A

| ORDER ID | ORDERED DATE AND TIME | ARTICLE ID | PLANNED SHIPPING DATE |
|---|---|---|---|
| 0001 | 10/2 | A | 10/25 |
| ... | | | |

| ARTICLE ID | COMPONENT ID | PRINT GROUP ID | RECEIVING DUE DATE |
|---|---|---|---|
| A | BODY | GROUP1 | |
| A | SUPPLIED ARTICLE | GROUP 2 | 10/17 |
| ... | | | |

| ORDER ID 211 | ORDERED DATE AND TIME 212 | ARTICLE ID 213 | PLANNED SHIPPING DATE 214 | COMPONENT ID 216 | RECEIVING DUE DATE 218 | COMPONENT ID 216 | RECEIVING DUE DATE 218 |
|---|---|---|---|---|---|---|---|
| 0001 | 10/2 | A | 10/25 | BODY | | SUPPLIED ARTICLE | 10/18 |
| 0002 | 10/2 | B | 10/21 | BODY | | SUPPLIED ARTICLE | 10/18 |
| 0003 | 10/5 | C | 10/24 | BODY | | SUPPLIED ARTICLE | 10/22 |
| 0004 | 10/3 | D | 10/26 | BODY | | SUPPLIED ARTICLE | 10/18 |
| 0005 | 10/1 | E | 10/24 | BODY | | | |
| 0006 | 10/5 | F | 10/24 | BODY | | SUPPLIED ARTICLE | 10/20 |

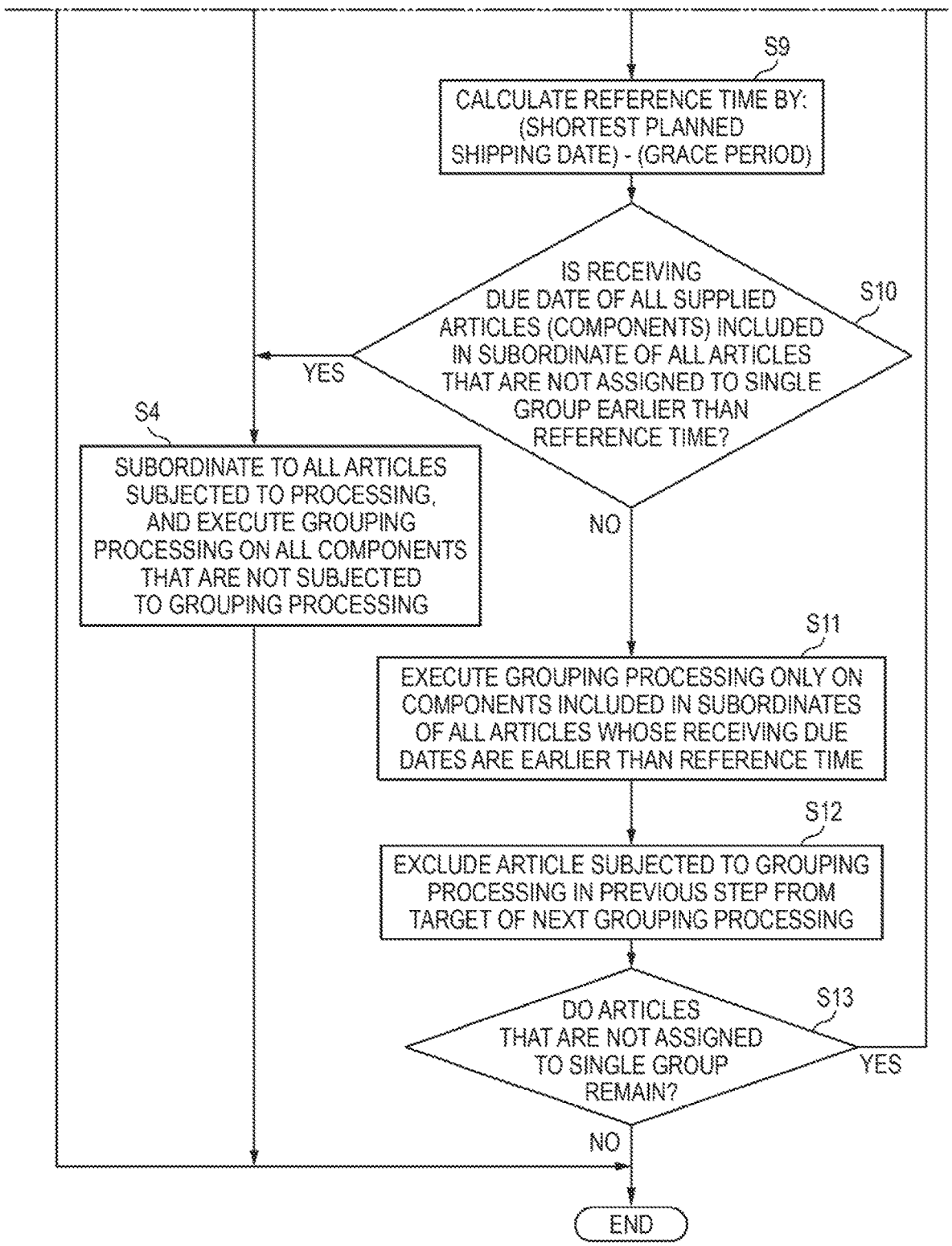

(FIG. 8 CONTINUED)

(D) ARTICLE D
    BODY
    SUPPLIED ARTICLE 1 — RECEIVING DATE 10/18 — RECEIVING DATE 10/20 — PLANNED SHIPPING DATE 10/26
    SUPPLIED ARTICLE 2

(E) ARTICLE E
    BODY ----- PLANNED SHIPPING DATE 10/24

(F) ARTICLE F
    BODY
    SUPPLIED ARTICLE — RECEIVING DATE 10/20 — PLANNED SHIPPING DATE 10/21
    COVER

(A) ARTICLE A
BODY
SUPPLIED ARTICLE (B) ARTICLE B
BODY
SUPPLIED ARTICLE
COVER (C) ARTICLE C
BODY
SUPPLIED ARTICLE

10/15

GROUPING

RECEIVING DATE 10/17

REFERENCE TIME (GRACE PERIOD: TWO DAYS) 10/19 12:30

TWO DAYS

PLANNED SHIPPING DATE 10/25

RECEIVING DATE 10/18

PLANNED SHIPPING DATE 10/21 12:30

RECEIVING DATE 10/22 0:00

PLANNED SHIPPING DATE 10/24 12:30

(D) ARTICLE D
     BODY
     SUPPLIED ARTICLE 1
     SUPPLIED ARTICLE 2

RECEIVING DATE 10/18
RECEIVING DATE 10/20
PLANNED SHIPPING DATE 10/26

(E) ARTICLE E
     BODY

PLANNED SHIPPING DATE 10/24

(F) ARTICLE F
     BODY
     SUPPLIED ARTICLE
     COVER

RECEIVING DATE 10/20
PLANNED SHIPPING DATE 10/21

...

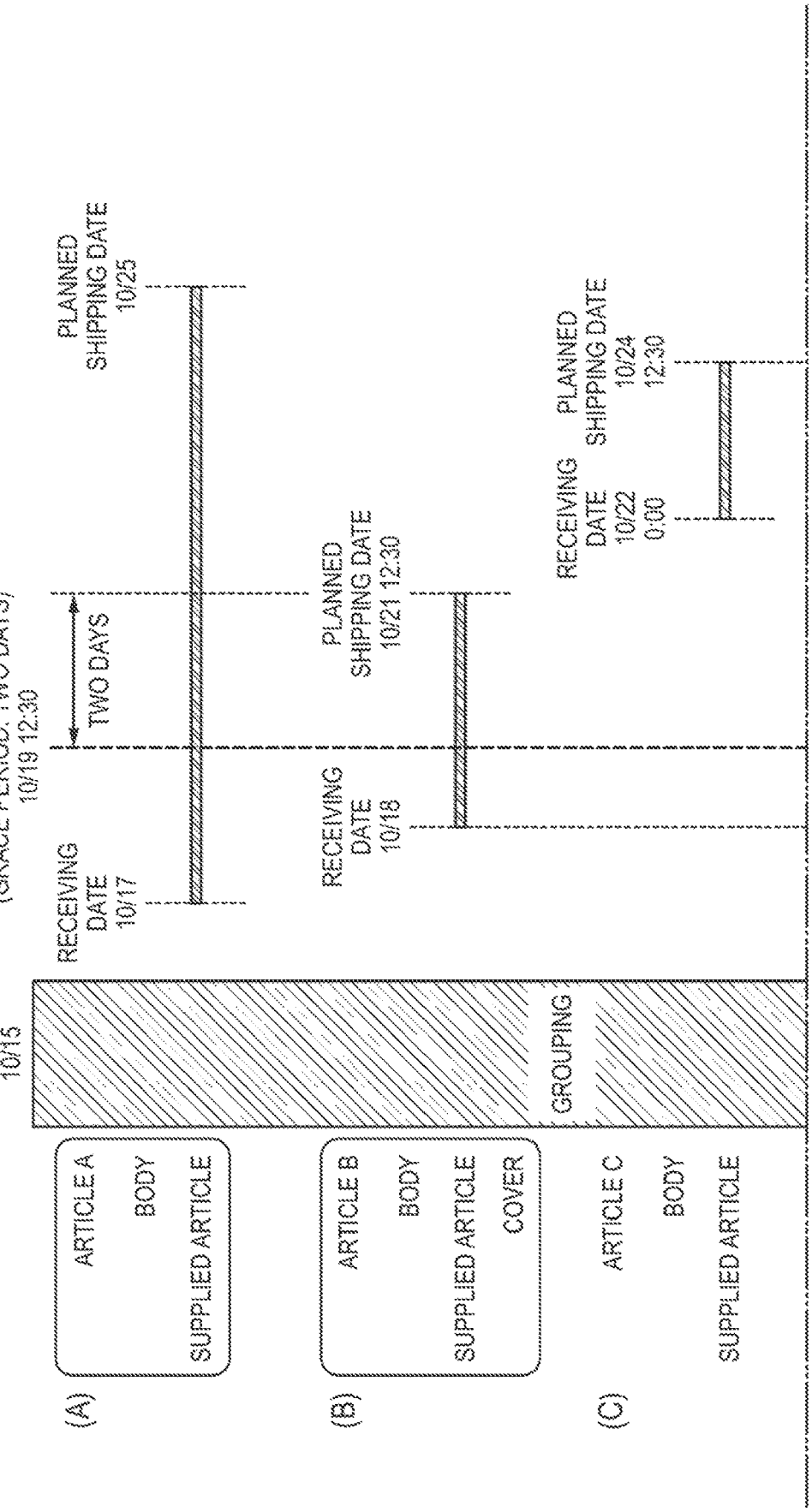

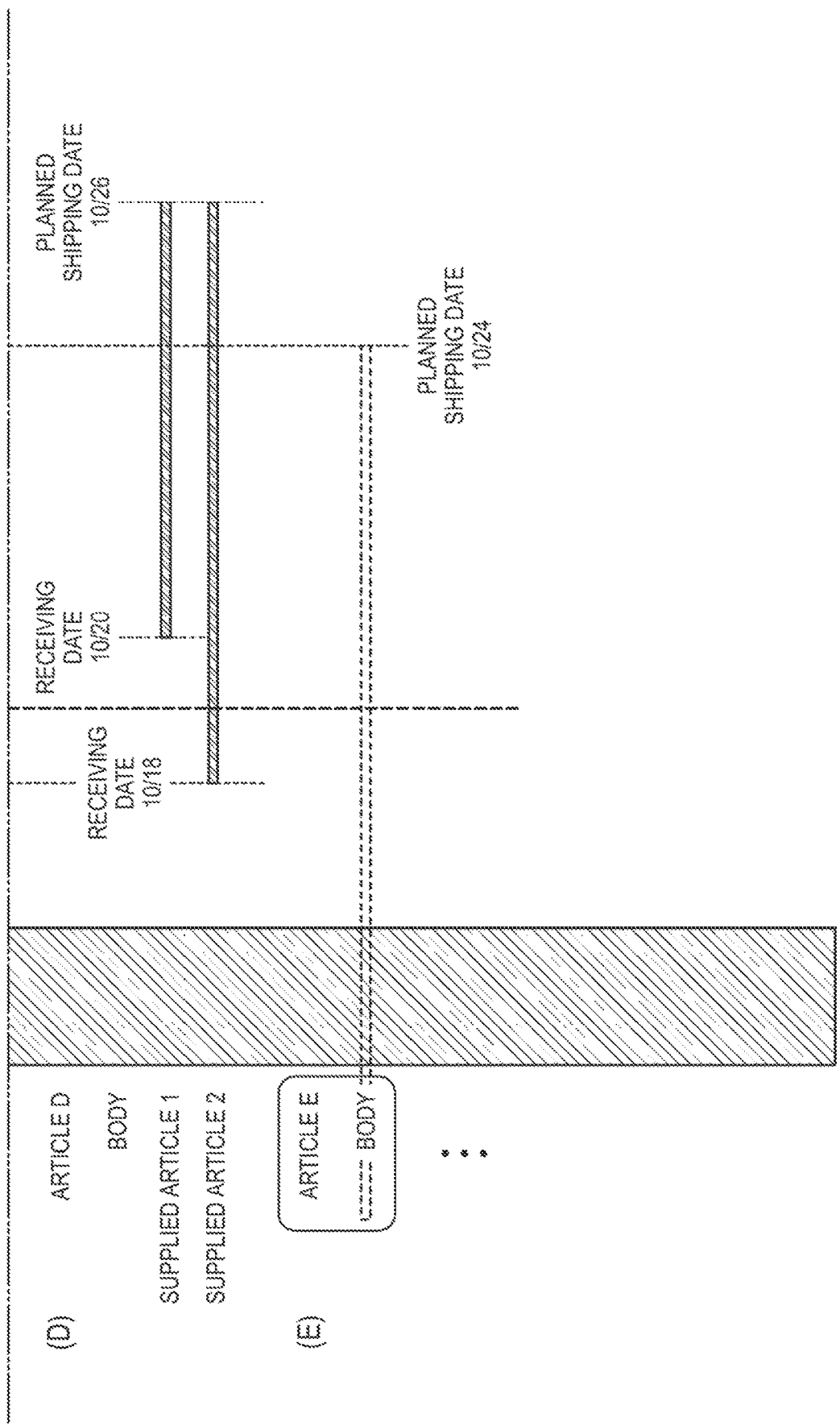

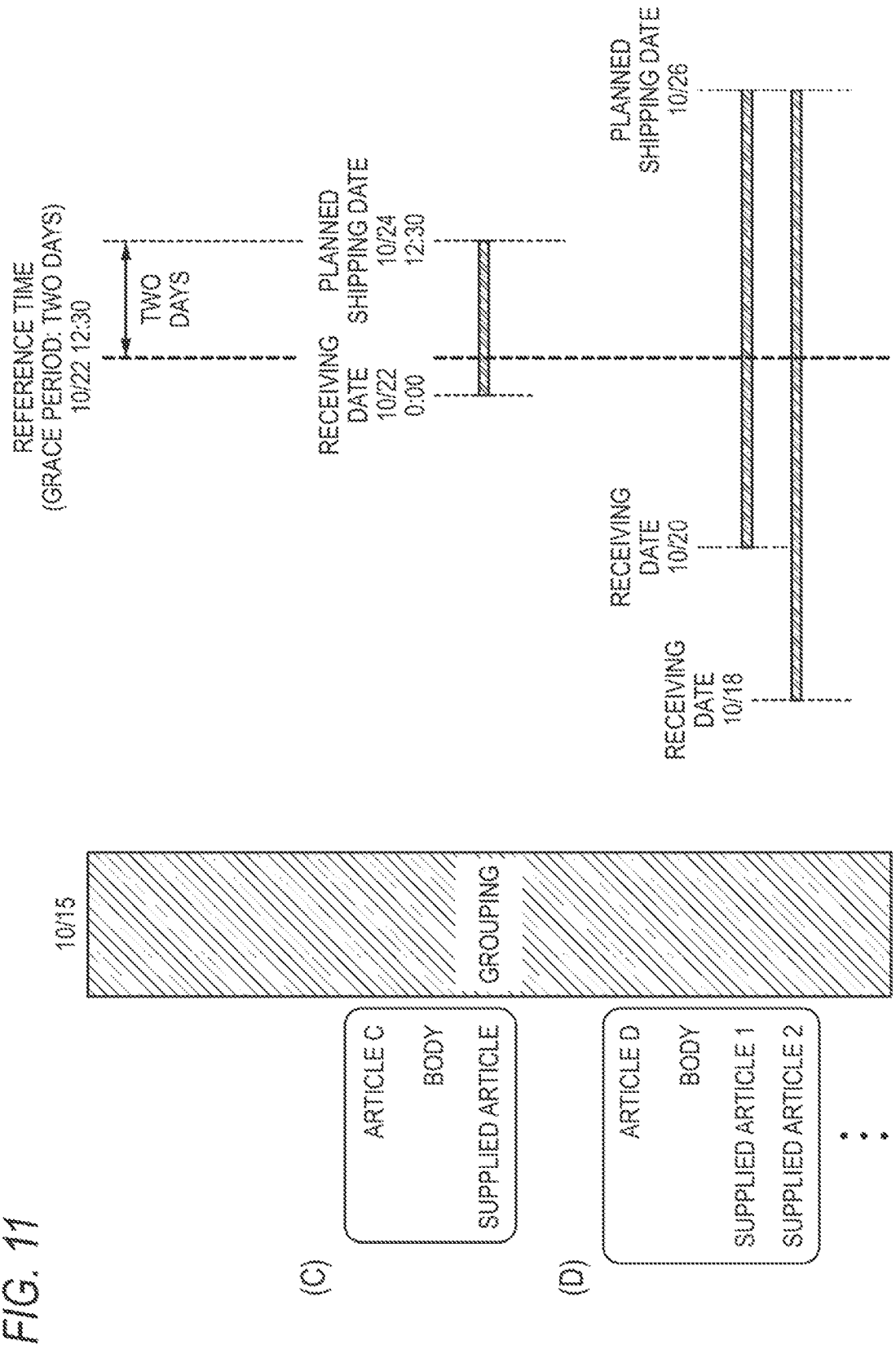

PRINT MANAGEMENT SYSTEM AND COMPUTER READABLE MEDIUM

CROSS REFERENCE

This application is based on and claims priority under 35 USC 119 from Japanese Patent Application No. 2019-014685 filed on Jan. 30, 2019.

BACKGROUND

Technical Field

The present invention relates to a print management system and a computer readable medium.

Related Art

A printed matter as an article is produced through a step of printing a cover, a body, and the like as a component, a post-step of combining a plurality of components, and the like. When production periods of a plurality of articles overlap, an order of combination and execution of the components is controlled so as to ensure continuity of the same type of components in each step in consideration of efficiency of each step (see JP-A-2014-232440). For example, in a printing step, the combination of the components is controlled such that the same type of components is printed on the same paper.

SUMMARY

The components printed on the same paper have the same timing in which post-steps are executed. Therefore, when the components constituting the plurality of articles are printed on the same paper, the plurality of articles are produced in the same post-step.

Many of the post-steps are started after all the components constituting the articles are complete. Therefore, production of a plurality of articles assigned to the same post-step is awaited until all the components constituting the plurality of articles are complete.

On the other hand, even in the same component, if the production may be distributed to a plurality of bases, some of the components may be supplied as received articles from the outside. A due date of receiving each of the components from the outside is determined based on a due date of the corresponding articles. Therefore, it is possible that a due date of receiving some of the components constituting a certain article is later than a due date of another article having the same unit of the post-steps.

Aspect of non-limiting embodiments of the present disclosure relates to prevent a due date delay in any of plural input data corresponding to component data set as a print unit.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a print management system including: a receiving unit that receives plural pieces of input data each of which includes component data and due date information; and a generating unit that, in a case where at least one piece of input data indicates that an extra part would be delivered independently from the plural input data, generates a grouped print job so that the grouped print job does not include extra data corresponding to an extra part whose delivery due date is later than shortest due date information among the due date information included in the plural pieces of input data that are received.

BRIEF DESCRIPTION OF DRAWINGS

Exemplary embodiment(s) of the present invention will be described in detail based on the following figures, wherein:

FIG. 3A shows an example of management data of an article level which is a target of order in an example of an order unit, and FIG. 3B shows an example of management data of a component level constituting an article in an example of an order unit;

FIG. 4 illustrates an example of a management screen integrally managing a plurality of orders;

FIG. 9 illustrates a setting example in a base period and an example of articles assigned to a single group, in which (A) shows a planned shipping date of an article A and a receiving due date of a supplied article, (B) shows a planned shipping date of an article B and a receiving due date of a supplied article, (C) shows a planned shipping date of an article C and a receiving due date of a supplied article, (D) shows a planned shipping date of an article D and a receiving due date of two supplied articles, (E) shows a planned shipping date of an article E, and (F) shows a planned shipping date of an article F and a receiving due date of a supplied article;

FIG. 10 illustrates an example of grouping an article, in which (A) shows a planned shipping date of an article A and a receiving due date of a supplied article, (B) shows a planned shipping date of an article B and a receiving due date of a supplied article, (C) shows a planned shipping date of an article C and a receiving due date of a supplied article, (D) shows a planned shipping date of an article D and a receiving due date of two supplied articles, and (E) shows a planned shipping date of an article E; and FIG. 11 illustrates an example of grouping two remaining articles, in which (C) shows a planned shipping date of an article C and a receiving due date of a supplied article, and (D) shows a planned shipping date of an article D and a receiving due date of two supplied articles.

DETAILED DESCRIPTION

Exemplary embodiments of the present invention will be described below with reference to drawings.

Exemplary Embodiment

<System Configuration>

Figure 1:
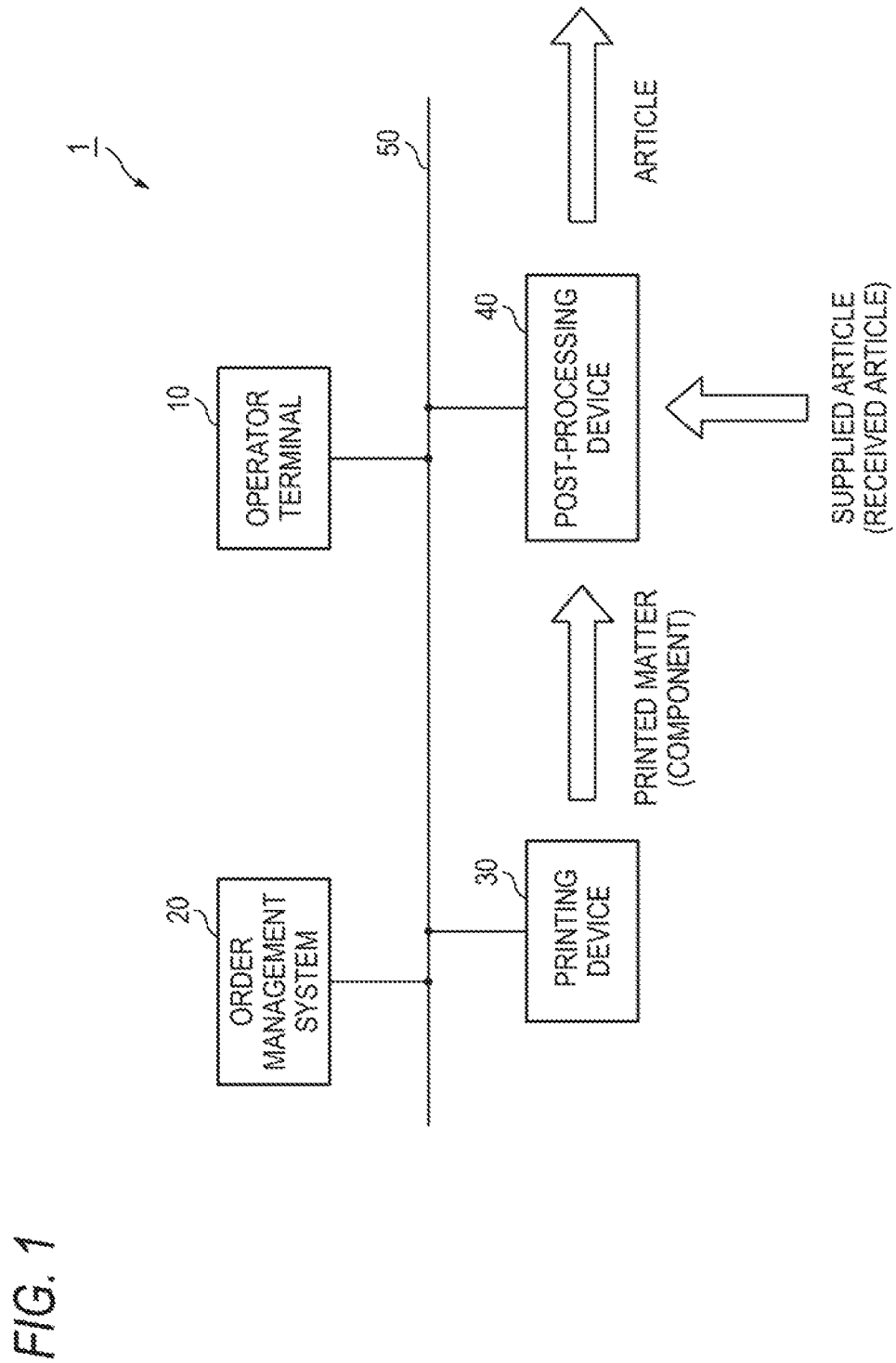
FIG. 1 shows an overall configuration example of a print management system used in an exemplary embodiment.

FIG. 1 shows an overall configuration example of a print management system 1 used in an exemplary embodiment.

The print management system 1 in FIG. 1 includes an operator terminal 10 that receives an order or the like, an order management device 20 that manages the received order, a printing device 30 that prints information on a recording material such as paper, and a post-processing device 40 that produces an article by executing post-processing on a printed matter or a supplied article.

These terminals and devices are connected to each other via, for example, a local area network (LAN) 50. The LAN 50 may be a wired LAN or a wireless LAN. Instead of the LAN 50, a communication network such as Internet may be used.

A print server (not shown) that controls a printing operation of the printing device 30 may be connected to the LAN 50.

The operator terminal 10 is a computer terminal operated by an operator, and includes a display device that displays an operation screen, and an input device such as a mouse and a keyboard. The operator terminal 10 is used for confirming and correcting management data managed in the order management device 20, setting and correcting a grouping function of submitted data, and the like.

The operator terminal 10, which is a computer terminal, includes a central processing unit (CPU) that controls the entire device through execution of a program (including a basic software), a read only memory (ROM) that memorizes a basic input output system (BIOS) or the like, a random access memory (RAM) that is used as an execution area of a program, a hard disk device as a memory area, and the like.

The order management device 20 is a computer terminal that manages a progress situation of processing by the printing device 30 and the post-processing device 40. In the present exemplary embodiment, the order management device 20 is a server having a database that memorizes management data. Therefore, the order management device 20 also includes a CPU that controls the entire device through execution of a program (including basic software), a ROM that memorizes a BIOS, a RAM that is used as an execution area of a program, a hard disk device as a memory area, and the like. The database is memorized in the hard disk device or the like.

The printing device 30 in the present exemplary embodiment is a continuous form printing machine that prints an image on continuous band-like roll paper or a continuous form (hereinafter collectively referred to as "continuous paper"). In FIG. 1, for convenience of illustration, the number of the printing devices 30 is one, but may be plural. In this case, printing methods of the plurality of printing devices 30 may be different. Further, the printing device 30 with the same printing method may have different makers, and the same maker may have different types of articles. In addition, the same type of the printing device 30 may be different in a recording material such as ink and toner used for printing an image, a type of the continuous paper on which an image is printed, and the like.

However, the printing device 30 is not limited to the continuous printing machine, but may be a printing machine that prints an image on cut paper. However, the present invention is limited to a case where components corresponding to a plurality of articles are laid out on a sheet of cut paper as a print unit.

In the present exemplary embodiment, a finished article is referred to as an article, and the printed matter or the like constituting the article is referred to as a component. Even one type of the component constituting the article is OK. In the present exemplary embodiment, the components are classified into three types: a cover, a body, and a supplied article. The supplied article is referred to as a printed matter or an attached article that is manufactured outside and delivered independently. Hereinafter, the supplied article is also referred to as an extra part or an ordered article.

The post-processing device 40 in the present exemplary embodiment is a device that processes the components to manufacture the article, and includes a folding machine, a bookbinding machine, a saddle stitching machine, a cutting machine, a collation machine, and the like. In the present exemplary embodiment, processing by these machines is collectively referred to as post-processing. In FIG. 1, for convenience of illustration, the number of the post-processing devices 40 is one, but may be plural.

The post-processing device 40 shown in FIG. 1 produces the article from the printed matter output from the printing device 30 and the supplied article given from the outside.

<Configuration of Order Management Device 20>

Figure 2:
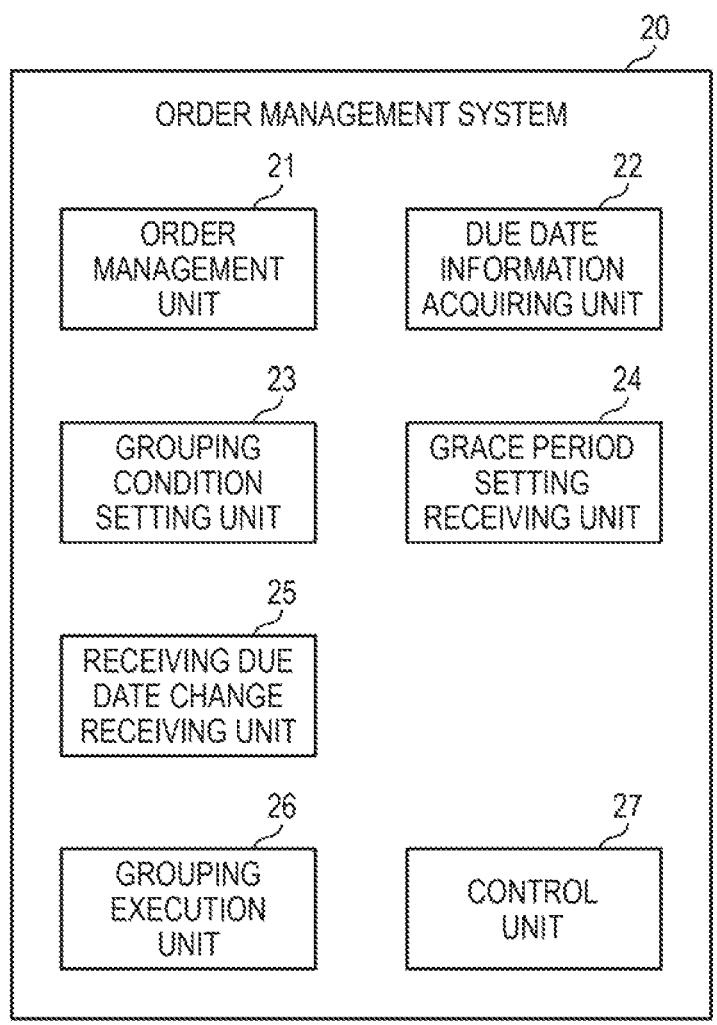
FIG. 2 shows an example of a functional configuration of an order management device used in the exemplary embodiment.

FIG. 2 shows an example of a functional configuration of an order management device 20 used in the exemplary embodiment.

A functional configuration shown in FIG. 2 is realized through execution of a program by a CPU as a processing circuit.

The order management device 20 shown in FIG. 2 functions as an order management unit 21 that manages a due date and progress of the order, a due date information acquiring unit 22 that acquires due date information included in the management data, a grouping condition setting unit 23 that sets conditions of processing of combining the same kind of components as the print unit (that is, grouping processing), a grace period setting receiving unit 24 that sets a grace period which is one of conditions of the grouping processing, a receiving due date change receiving unit 25 that receives change of a receiving due date of the supplied article, a grouping execution unit 26 that executes grouping processing based on the set conditions, and a control unit 27 that controls an operation of the printing device 30 (see FIG. 1) and the post-processing device 40 (see FIG. 1).

The order management unit 21 in the present exemplary embodiment manages order data received through the operator terminal 10 (see FIG. 1). However, the order management unit 21 may directly receive the order data through Internet or the like. The order data is data corresponding to an individual order, and is an example of input data. The order data also includes data of components constituting the article which is a target of order (hereinafter, component data) and information about the due date of the article (hereinafter, due date information).

The order management unit 21 in the present exemplary embodiment handles order data corresponding to multiple kinds and a small number of orders. The order management unit 21 is an example of a receiving unit.

FIGS. 3A and 3B illustrate an example of management data of an order unit. FIG. 3A shows an example of management data of an article level which is a target of order, and FIG. 3B shows an example of management data of a component level constituting an article.

In FIGS. 3A and 3B, article level management data includes an order ID 211 for distinguishing the order, a date and time of accepting the order (hereinafter, ordered date and time) 212, an article ID 213 for distinguishing the article, and a date and time of shipping the manufactured article (hereinafter, planned shipping date) 214. In an example of FIG. 3A, "0001" is recorded as the order ID 211, "10/2" is recorded as the order date and time 212, "A" is recorded as the article ID 213, and "10/25" is recorded as the planned shipping date 214.

The component level management data includes an article ID 215 indicating an associated article, a component ID 216 for distinguishing components constituting the article, a print group ID 217 for distinguishing a print group to which each component is assigned, and a receiving due date 218 of the component that is a supplied article. The print group is an example of a print unit. In the example of FIG. 3B, two components of the body and the supplied article are registered for the article whose article ID 215 is "A".

The body is assigned to group 1, and the supplied article is assigned to group 2. Since the supplied article is printed outside, the body and the supplied article are assigned to an independent group, respectively. Incidentally, the print group ID 217 is recorded after execution of grouping by the grouping execution unit 26 (see FIG. 2).

Since the body is not the supplied article, there is no description in a column of the corresponding receiving due date 218. On the other hand, the receiving due date 218 of the supplied article is "10/17".

FIG. 4 illustrates an example of a management screen integrally managing a plurality of orders. In FIG. 4, parts corresponding to those in FIGS. 3A and 3B are denoted by corresponding signs.

In an example of FIG. 4, six orders of articles A, B, C, D, E, and F are managed. In FIG. 4, the print group ID 217 (see FIGS. 3A and 3B) is omitted for convenience of page space.

Further, in the example of FIG. 4, in order to describe information of one article in one line, the component ID 216 and the receiving due date 218 of five articles A, B, C, D, and F including a plurality of components are described by the number of the components.

Incidentally, since the component of the article E is only the body, there is only description of the body in the first component ID 216.

Return to illustration of FIG. 2.

The due date information acquiring unit 22 acquires due date information of the target of order from the management data, and due date information (that is, receiving due date) of the supplied article in the components constituting the article. The acquired due date information is referred to when each component is grouped into a print group.

The grouping condition setting unit 23 is used to receive setting of the grouping conditions.

Figure 5:
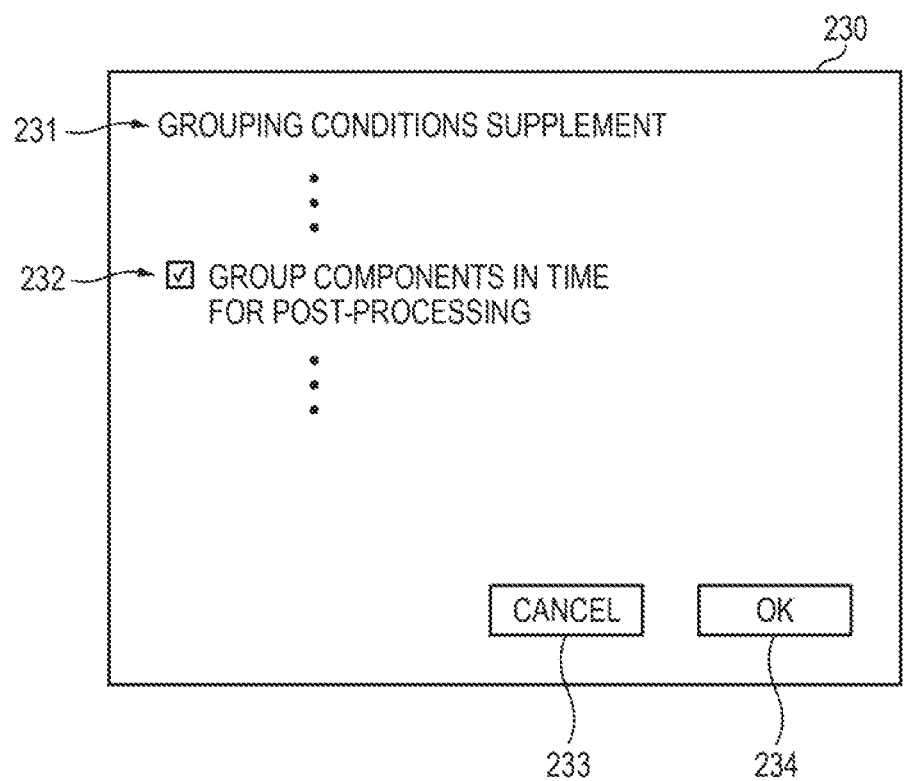
FIG. 5 shows a part of a setting screen under grouping conditions.

FIG. 5 shows a part of a setting screen 230 under grouping conditions. The setting screen 230 shown in FIG. 5 includes a title 231, a selection column 232 of items and conditions referred to at the time of grouping, a button 233 for cancelling a content of the setting, and a button 234 for enabling the content of the setting.

The selection column 232 includes a customer ID, the number of colors used in printing, a component ID, dimensions of paper, an output planned device, and the like as selectable items. In each item, a check box for selection is prepared.

In an example of FIG. 5, only functions specific to the present exemplary embodiment are shown in the selection column 232. That is, only an item "group components in time for post-processing" and a corresponding check box are displayed. Here, the "group components in time for post-processing" means a function of executing grouping in consideration of a period of post-processing to complete the article. In the example of FIG. 5, a check mark is entered in the check box corresponding to the item.

Return to illustration of FIG. 2.

The grace period setting receiving unit 24 is used to receive setting of the grace period when the print group is generated by grouping the components in time for the post-processing. In the present exemplary embodiment, the grace period is a period required or assigned to the post-processing.

Figure 6:
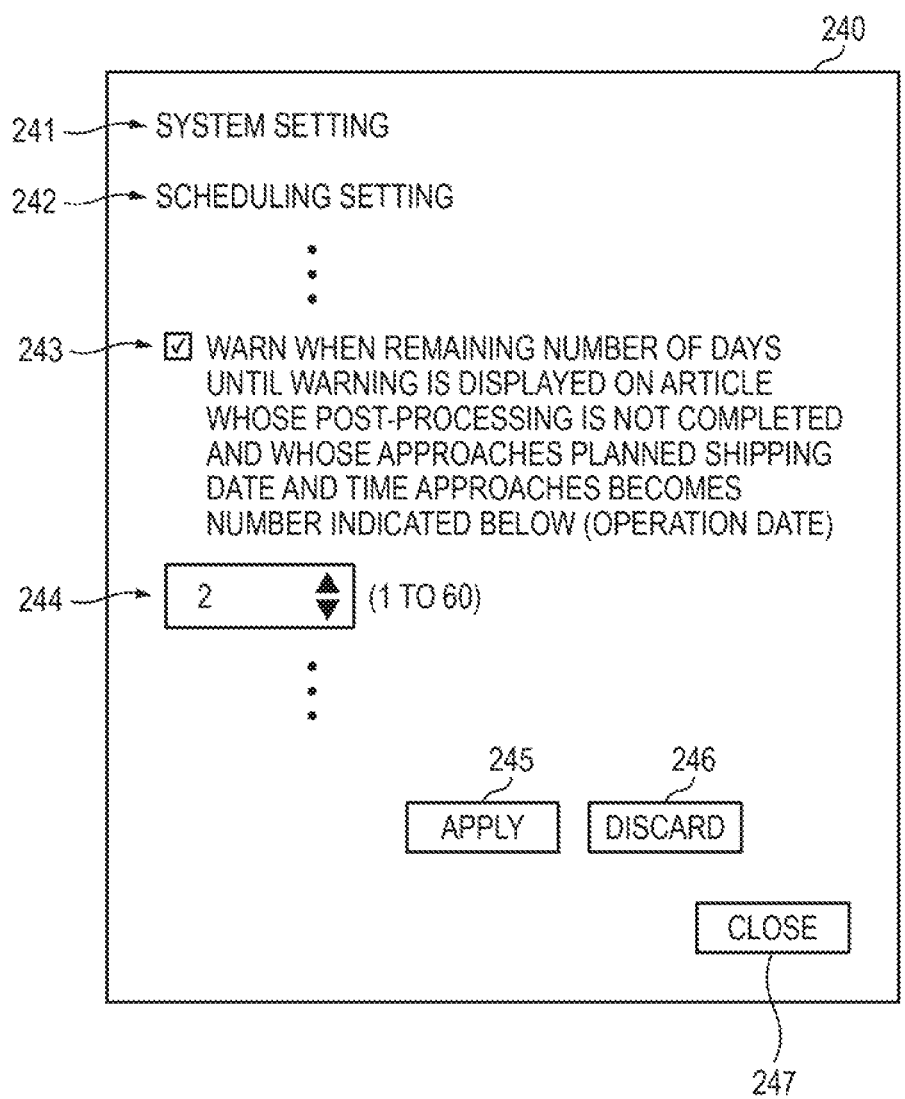
FIG. 6 shows a part of a setting screen used for setting in a grace period.

FIG. 6 shows a part of a setting screen 240 used for setting of the grace period. The setting screen 240 shown in FIG. 6 includes a title 241 as a large classification and a title 242 as a small classification. In FIG. 6, setting of the grace period may be performed on a screen of scheduling setting of system setting.

In the setting screen 240, a setting column 243 of an item related to scheduling is displayed.

In the setting column 243, an interval (not shown) from the end of printing to the start of post-processing (not shown), time required for inspection (not shown), time required for shipping operation, and the like are prepared as settable items. These items may be set by hours and minutes separately.

In an example of FIG. 6, only functions specific to the present exemplary embodiment are shown in the setting column 243. In other words, a check box related to execution of a function of displaying a warning on an article whose post-processing is not completed even though the planned shipping date, which is a shipping deadline of the article, is approaching, is arranged. In the example of FIG. 6, since a check mark is present in the check box, the same function is enabled.

In the example of FIG. 6, a description text requesting setting of the remaining number of days to the planned shipping date and an input column 244 of the number of days are arranged at the time of displaying the warning.

In the example of FIG. 6, these meanings are expressed in description of "warn when the remaining number of days until a warning is displayed on the article whose post-processing is not completed and whose planned shipping date and time approaches becomes the number indicated below (operation date)".

In the present exemplary embodiment, the remaining number of days to the planned shipping date at the time of displaying the warning is the same as the number of days of the grace period. In the input column 244, the number of days based on operation days may be selected in a range of 1 day to 60 days. In the example of FIG. 6, two days are selected.

In the present exemplary embodiment, the operator may specify the number of days. Change in the grace period becomes effective from setting of the next print group. Therefore, when grouping processing started in a background is present during an operation by the setting screen 240, the grace period after the change is not reflected.

In the present exemplary embodiment, in order to change the grace period, a warning function and a setting function in the grace period may be separated as long as the function of warning the presence of the article whose post-processing is uncompleted is enabled even though the planned shipping date is approaching. That is, an input item dedicated to setting of the grace period may be prepared. In this case, remaining time when the warning is displayed may not coincide with the grace period.

In the present exemplary embodiment, when the check mark that enables the warning function is not entered, a specified value set at the time of article shipment is used in the grace In addition, a button 245 for instructing application of the set content, a button 246 for instructing discarding of the set content, and a button 247 for closing the setting screen 240 are prepared on the setting screen 240.

Return to illustration of FIG. 2.

The receiving due date change receiving unit 25 is used to change the receiving due date of the supplied article in the management data managed by the order management unit 21. For example, the management screen shown in FIG. 4 is used to change the receiving due date. The receiving function is prepared in order to reflect a change in the post-receiving due date in the management data.

However, the change in the receiving due date is limited before setting processing of the print group (that is, grouping of printing) is started. As will be described later, the grouping of printing is to execute grouping using the receiving due date of the supplied article.

Even when the change is permitted, it is not permitted to designate date and time in the past of the current time as the receiving due date after the change. Further, the receiving due date after the change is not permitted to be included in the grace period with respect to the planned shipping date of the article containing the supplied article in the components. For example, when the planned shipping date is Dec. 28, 2018 and the grace period is two days, it is not permitted to change the receiving due date to Dec. 27, 2018. This is because it is necessary to complete all components necessary for manufacturing the article before on Dec. 26, 2018 in this example.

The grouping execution unit 26 sets a print unit (that is, a group) so as to satisfy grouping conditions set in advance for all components corresponding to the received order.

In the present exemplary embodiment, the grouping is executed in consideration of a relationship between the planned shipping date that is a due date of the corresponding article and the receiving due date of the supplied article instead of executing grouping based on only the component type. The grouping execution unit 26 is an example of a generating unit.

The control unit 27 controls execution of printing by the printing device 30 (see FIG. 1) in accordance with a set group unit.

<Grouping Processing>

Figure 7:
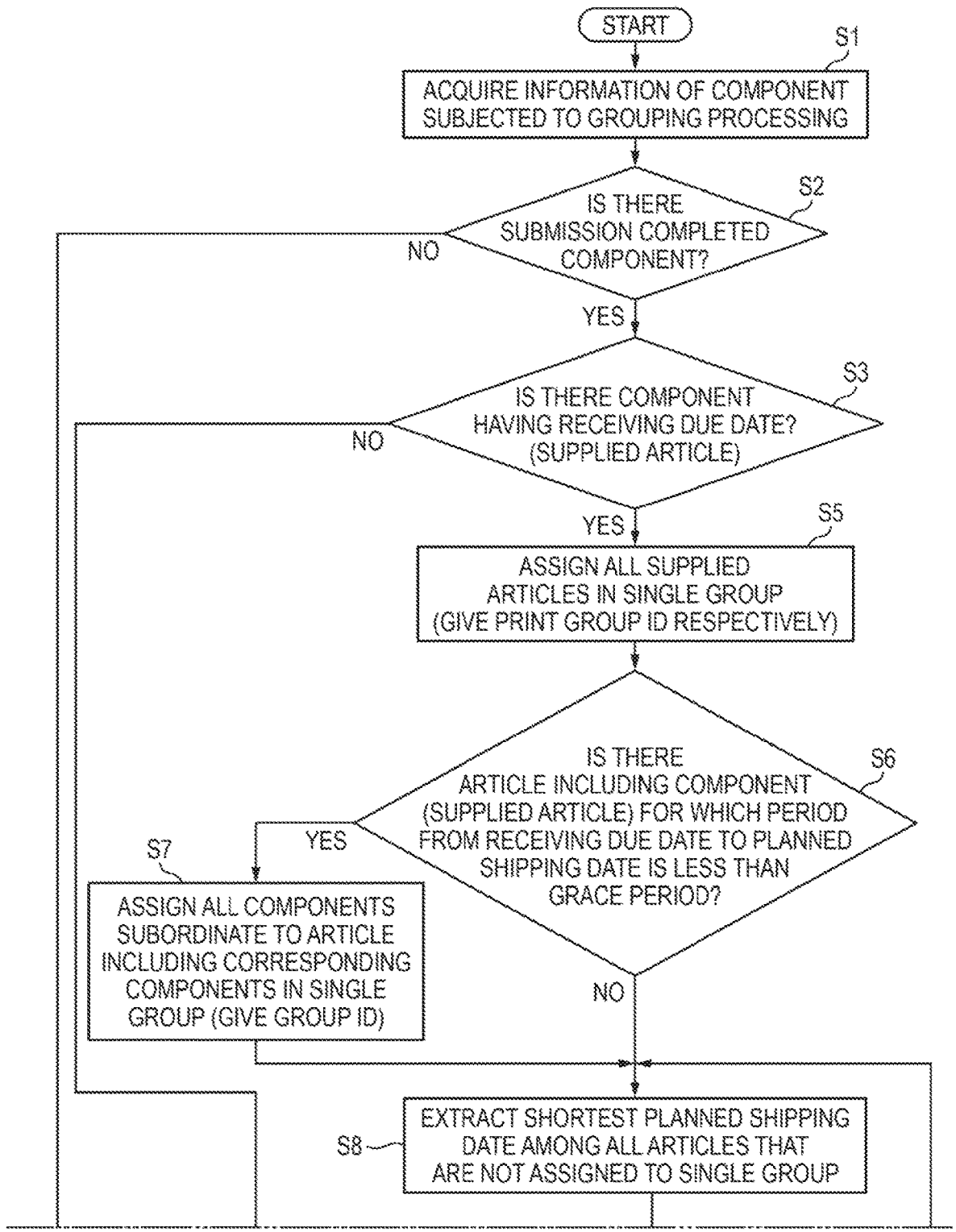
FIG. 7 is a flowchart showing an example of grouping processing executed by a grouping execution unit.

FIG. 7 is a flowchart showing an example of grouping processing executed by a grouping execution unit 26 (see FIG. 2).

First, the grouping execution unit 26 acquires information of a component subjected to grouping processing (step 1). For example, information of the components constituting each of the articles A, B, C, D, E, and F is acquired.

Next, the grouping execution unit 26 determines whether there is a submission completed component (step 2). Here, the "submission completed component" refers to a component in a state in which the print group may be set up. Components that do not complete submission include, for example, a component for which processing status is a hold state.

When a negative result is obtained in step 2 (that is, when there is no submission completed component), the grouping execution unit 26 ends the grouping processing.

On the other hand, when a positive result is obtained in step 2, the grouping execution unit 26 determines whether there is a component having a receiving due date (that is, a supplied article) (step 3). That is, it is determined whether it is necessary to receive a component to which printing is entrusted to the outside or to receive a component prepared by the outside.

When a negative result is obtained in step 3, the grouping execution unit 26 is subordinate to all articles subjected to processing, and executes grouping processing on all components that are not subjected to grouping processing (step 4). In this case, since there is no component for which the receiving due date is set, all the components may be assigned to a single group. Thereafter, the grouping execution unit 26 ends the grouping processing.

On the other hand, when a positive result is obtained in step 3, the grouping execution unit 26 assigns all the supplied articles to a single group (step 5). That is, the print group ID is given to each supplied article.

Next, the grouping execution unit 26 determines whether there is an article including a component (that is, supplied article) in which a period from the receiving due date to the planned shipping date is less than the grace period (step 6).

As described above, the grace period is a period secured for post-processing. Therefore, it is necessary to separately manage special orders such that the period from the receiving due date to the planned shipping date is less than the grace period.

Further, in the present exemplary embodiment, a time when only the grace period arrives earlier than the planned shipping date selected for grouping is used as a reference time for grouping, and processing of grouping components subordinate to the article in which all the components are complete to the reference time (for example, step 11) is executed. Therefore, when the determination in step 6 is not provided, a component for which the receiving due date is set between the reference time and the planned shipping date and other components subordinate to the article including the corresponding components cannot be included in the grouping target no matter how long time passes.

Therefore, in the present exemplary embodiment, it is determined whether there is an article including a component for which time from the receiving due date of the supplied article to the planned shipping date is short exceptionally, as shown in step 6.

When a positive result is obtained in step 6, the grouping execution unit 26 assigns all components subordinate to the article including the corresponding components in a single group (step 7). In other words, a single print group ID is given to all components included in a specific article regardless of whether they are supplied articles.

When a negative result is obtained in step 6 or after step 7, the grouping execution unit 26 extracts the shortest planned shipping date among all articles that are not assigned to a single group (step 8). In other words, a due date (that is, planned shipping date) of the article that arrives earliest from the current time is extracted.

Next, the grouping execution unit 26 calculates the reference time by subtracting the grace period from the shortest planned shipping date (step 9). For example, when the planned shipping date is 12:30 on Oct. 21, 2018 and the grace period is 2 days, the reference time is 12:30 on Oct. 19, 2018.

Subsequently, the grouping execution unit 26 determines whether a receiving due date of all supplied articles (that is, components) included in the subordinate of all articles that are not assigned to a single group is earlier than the reference time (step 10).

In the determination, for example, the current time is used as a provisional receiving due date of an article that does not include a supplied article.

When a plurality of supplied articles are included in one article, a positive result is obtained only when all of a plurality of receiving due dates defined for each supplied articles are set earlier than the reference time. This is to avoid a situation in which a plurality of supplied articles included in the subordinate of one article are distributed into a plurality of groups as in a previous technique.

When a positive result is obtained in step 10, the grouping execution unit 26 moves to step 4 described above, and gives one print group ID to all components that are not subjected to grouping processing included in the subordinate of all the articles that are not assigned to a single group.

When a negative result is obtained in step 10, the grouping execution unit 26 executes grouping processing only on components included in the subordinates of all the articles whose receiving due dates are earlier than the reference time (step 11).

When the grouping processing of step 11 ends, the grouping execution unit 26 excludes the article subjected to grouping processing in the previous step (that is, step 11) from a target of the next grouping processing (step 12).

Further, the grouping execution unit 26 determines whether the articles that are not assigned to a single group remain (step 13).

When a negative result is obtained in step 13, the grouping execution unit 26 ends the grouping processing.

On the other hand, when a positive result is obtained in step 13, the grouping execution unit 26 returns to step 8, newly extracts the shortest planned shipping date in the remaining article, and continues grouping processing.

<Specific Example of Grouping Processing>

A specific example of grouping processing will be described below with reference to FIG. 8 to FIG. 11.

Figure 8:
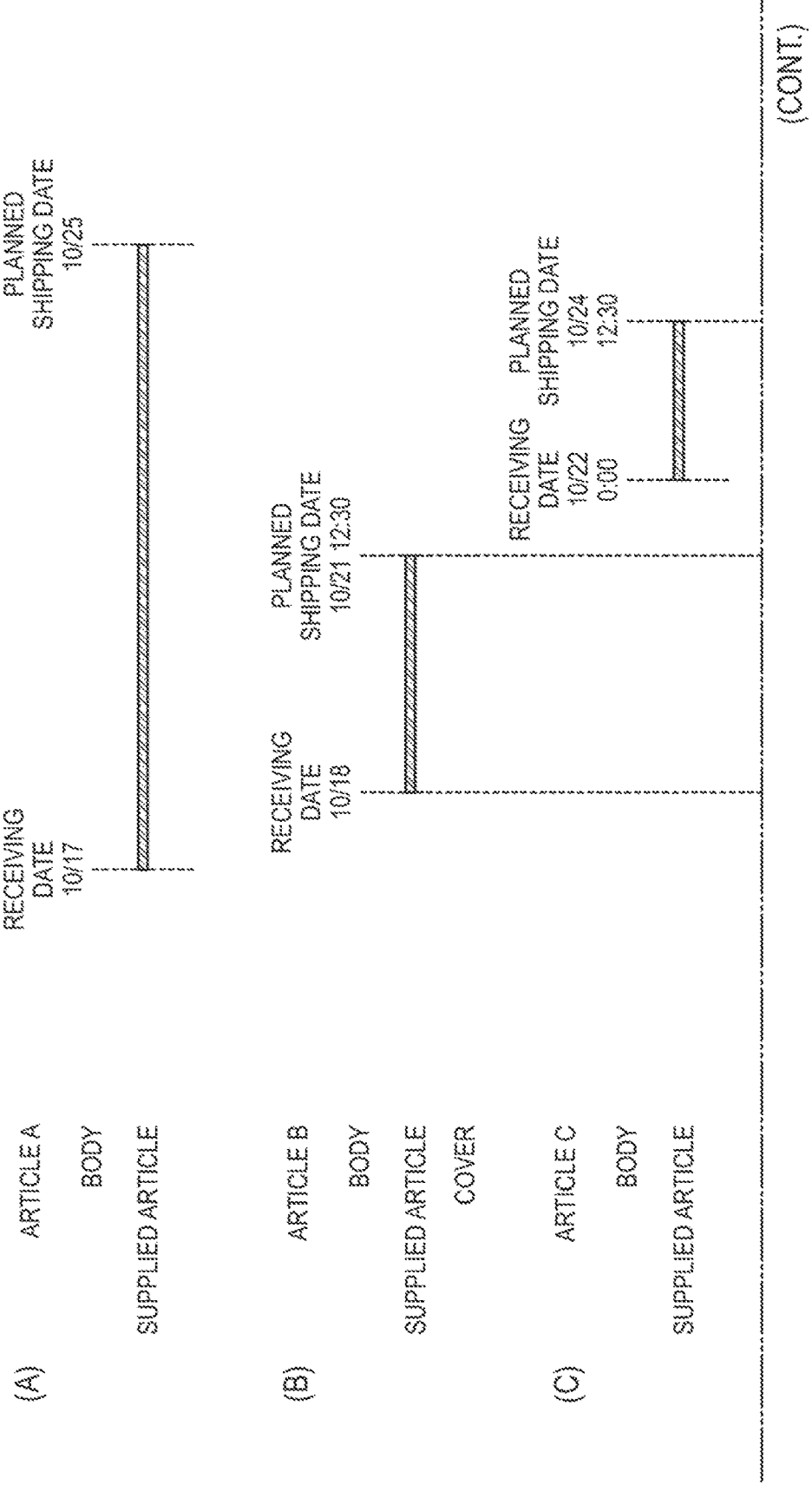
FIG. 8 illustrates a relationship between a component structure and each due date of six articles which are subjected to grouping processing, in which (A) shows a planned shipping date of an article A and a receiving due date of a supplied article, (B) shows a planned shipping date of an article B and a receiving due date of a supplied article, (C) shows a planned shipping date of an article C and a receiving due date of a supplied article, (D) shows a planned shipping date of an article D and a receiving due date of two supplied articles, (E) shows a planned shipping date of an article E, and (F) shows a planned shipping date of an article F and a receiving due date of a supplied article.

FIG. 8 illustrates a relationship between a component structure and each due date of six articles A, B, C, D, E, and F which are subjected to grouping processing. In FIG. 8, (A) shows a planned shipping date of an article A and a receiving due date of a supplied article, (B) shows a planned shipping date of an article B and a receiving due date of a supplied article, (C) shows a planned shipping date of an article C and a receiving due date of a supplied article, (D) shows a planned shipping date of an article D and a receiving due date of two supplied articles, (E) shows a planned shipping date of an article E, and (F) shows a planned shipping date of an article F and a receiving due date of a supplied article.

In a case of FIG. 8, the article A is composed of two components: a body and a supplied article. The planned shipping date of the article A is 10/25, and the receiving due date of the supplied article is 10/17.

The article B is composed of three components: a body, a supplied article, and a cover. The planned shipping date of the article B is 12:30 of 10/21, and the receiving due date of the supplied article is 10/18.

The article C is composed of two components: a body and a supplied article. The planned shipping date OF the article C is 12:30 of 10/24, and the receiving due date of the supplied article is 0:00 of 10/22.

The article D is composed of three components: a body, a supplied article 1, and a supplied article 2. The planned shipping date of the article D is 10/26, the receiving due date of the supplied article 1 is 10/20, and the receiving due date of the supplied article 2 is 10/18.

The article E is composed of only the body. That is, there is one component. The planned shipping date of the article E is 10/24.

The article F is composed of three components: a body, a supplied article, and a cover. The planned shipping date of the article F is 10/21, and the receiving due date of the supplied article is 10/20.

FIG. 9 illustrates a setting example in a base period and an example of articles assigned to a single group. In FIG. 9, parts corresponding to those in FIG. 8 are denoted by corresponding signs. Therefore, in FIG. 9, (A) shows a planned shipping date of an article A and a receiving due date of a supplied article, (B) shows a planned shipping date of an article B and a receiving due date of a supplied article, (C) shows a planned shipping date of an article C and a receiving due date of a supplied article, (D) shows a planned shipping date of an article D and a receiving due date of two supplied articles, (E) shows a planned shipping date of an article E, and FIG. 9F shows a planned shipping date of an article F and a receiving due date of a supplied article.

In a case of FIG. 9, an execution date of grouping is 10/15.

As is clear from FIG. 9, among the six articles A, B, C, D, E, and F, the shortest planned shipping date is the planned shipping date of the article B. Specifically, it is 12:30 of 10/21.

In this case, a reference time is set to 12:30 of 10/19 by step 9 (see FIG. 7). The grace period is two days.

Among the six articles shown in FIG. 9, only the article F has a period of only one day from the receiving due date to the planned shipping date, and the period is shorter than two days of the grace period.

Therefore, in FIG. 9, three components: a body, the supplied article, and a cover constituting the article F are assigned to a single group. In FIG. 9, the single group is surrounded by a closing line. Processing of assigning the article F to a single group corresponds to step 6 and step 7 in FIG. 7.

FIG. 10 illustrates an example of grouping an article. In FIG. 10, parts corresponding to those in FIG. 8 are denoted by corresponding signs. Therefore, in FIG. 10, (A) shows a planned shipping date of an article A and a receiving due date of a supplied article, (B) shows a planned shipping date of an article B and a receiving due date of a supplied article, (C) shows a planned shipping date of an article C and a receiving due date of a supplied article, (D) shows a planned shipping date of an article D and a receiving due date of two supplied articles, and (E) shows a planned shipping date of an article E. Since the article F is assigned to a single group in step 7 (see FIG. 7), the article F is excluded from the grouping target.

Also in a case of FIG. 10, reference time is the same as that in FIG. 9. That is, the reference time is 12:30 of 10/19.

In the case of FIG. 10, there are three articles including components whose receiving due dates are earlier than the reference time. There are three articles A, B, and D. However, the article D includes two components in which the receiving due date is set, and a receiving due date of a supplied article 1 is 10/20, which is later than the reference. Therefore, the article D does not satisfy conditions of step 10 (see FIG. 7), and is excluded from the grouping target.

The article E contains only a component (that is, a body) whose schedule of printing may be set freely. Therefore, in the example of FIG. 10, the three articles A, B, and E are assigned to a single group (see step 11 in FIG. 7). As described above, the current time is used as the provisional receiving due date of the article E.

After the above processing, the number of articles subjected to grouping decreases from six in an initial stage to two.

FIG. 11 illustrates an example of grouping two remaining articles. In FIG. 11, parts corresponding to those in FIG. 8 are denoted by corresponding signs. Therefore, in FIG. 11, (C) shows a planned shipping date of an article C and a receiving due date of a supplied article, and (D) shows a planned shipping date of an article D and a receiving due date of two supplied articles.

In a case of FIG. 11, the shortest planned shipping date is set for the articles C and D (see step 8 in FIG. 7). In this example, 10/24 of the article C is the shortest planned shipping date. Thus, a reference time is 12:30 of 10/22, which is two days earlier than 12:30 of 10/24.

In the case of FIG. 11, there are two articles including components whose receiving due dates are earlier than the reference time. That is, there are two articles C and D.

As shown in FIG. 11, the receiving due date of the article C is 0:00 of 10/22, the receiving due date of the supplied article 1 of the article D is 10/20, and the receiving due date of the supplied article 2 is 10/18, which are earlier than the reference time. Therefore, both of the articles C and D are assigned to a single group (see step 11 in FIG. 7).

Other Exemplary Embodiments

Although the description is made by using the exemplary embodiments of the present invention, the technical scope of the present invention is not limited to the above described embodiments. It is also apparent from the scope of claims that various modifications or improvements to the above-described exemplary embodiments are included in the technical scope of the present invention.

Although order data has been described as an example of input data in the above-described exemplary embodiment, the input data may be article data or component data. The input data may be an instruction that does not include image data.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print management system comprising:
   a processor configured to;
   receive a plurality of pieces of input data each of which includes component data and due date information; and
   generate, in a case where at least one piece of input data indicates that an extra part would be delivered independently from the plurality of input data, a grouped print job so that the grouped print job does not include extra data corresponding to an extra part whose delivery due date is later than shortest due date information among the due date information included in the plurality of pieces of input data that are received.

2. The print management system according to claim 1, wherein the processor is configured to generate the grouped print job so that the grouped print job does not include extra data corresponding to an extra part whose receiving due date is later than a reference time and such that input data including extra data corresponding to an extra part whose receiving due date is later than the reference time is excluded from the grouped print job, the reference time being a time earlier than the shortest due date information by a predetermined grace period.

3. The print management system according to claim 2, wherein the grace period is changed using a setting screen.

4. The print management system according to claim 3, wherein a change of the grace period is effective until the processor completes generating of the grouped print job for all of the plurality of pieces of input data that are received at a time when the processor starts the generating of the grouped print job.

5. The print management system according to claim 2, wherein the processor is configured to generate a single grouped print job for input data in which an extra part whose receiving due date is within the grace period is included even though the extra part whose receiving due date is later than the shortest due date information is not included in the input data.

6. The print management system according to claim 1, wherein, in a case where a plurality of extra parts are included in the input data, the processor is configured to generate the grouped print job only for the input data in which all of receiving due dates of the plurality of extra parts are earlier than the shortest due date information.

7. The print management system according to claim 1, wherein the processor is configured to determine input data in which the extra part is not included as the input data in which the extra part whose receiving due date is later than the shortest due date information is not included.

8. The print management system according to claim 1, wherein the processor repeats generating of the grouped print job so that the grouped print job does not include extra data corresponding to the extra part whose delivery due date is later than the shortest due date information among the due date information included in the plurality of pieces of input data that are not included in the grouped print job until the the processor generates the grouped print job for all of the plurality of pieces of input data received at a time when the processor starts generating of the grouped print job.

9. A non-transitory computer readable medium storing a program causing a computer to execute a process, the process comprising:
   receiving a plurality of pieces of input data each of which includes component data and due date information; and
   generating, in a case where at least one piece of input data indicates that an extra part would be delivered independently from the plurality of input data, generates a grouped print job so that the grouped print job does not include extra data corresponding to an extra part whose delivery due date is later than shortest due date information among the due date information included in the plurality of pieces of input data that are received.

* * * * *